(12) United States Patent
Storm et al.

(10) Patent No.: US 12,019,633 B2
(45) Date of Patent: Jun. 25, 2024

(54) PROVIDING MULTI-TIER QUERY EXECUTION OPTIONS IN A SERVERLESS QUERY ENVIRONMENT

(71) Applicant: International Business Machines Corporation, Armonk, NY (US)

(72) Inventors: Adam J. Storm, Toronto (CA); Gustavo Arocena, Toronto (CA); Ronen Grosman, Thornill (CA); Christian Garcia-Arellano, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 16/517,429

(22) Filed: Jul. 19, 2019

(65) Prior Publication Data

US 2021/0019320 A1 Jan. 21, 2021

(51) Int. Cl.
*G06F 16/2453* (2019.01)
*G06F 9/54* (2006.01)

(52) U.S. Cl.
CPC .......... *G06F 16/24545* (2019.01); *G06F 9/54* (2013.01)

(58) Field of Classification Search
CPC .... G06F 16/24545; G06F 9/54; G06F 9/4881; G06F 16/90335; G06F 9/5072; G06Q 30/0283
See application file for complete search history.

(56) References Cited

U.S. PATENT DOCUMENTS

| | | | |
|---|---|---|---|
| 11,025,703 B1* | 6/2021 | Wei | G06Q 30/08 |
| 11,100,106 B1* | 8/2021 | Sainanee | G06F 16/2453 |
| 11,467,858 B2* | 10/2022 | Liguori | G06F 9/54 |
| 2017/0149681 A1* | 5/2017 | Chen | G06F 9/46 |
| 2017/0212780 A1* | 7/2017 | Hoole | H04L 63/102 |
| 2017/0357530 A1* | 12/2017 | Shih | G06F 9/5038 |
| 2018/0034924 A1 | 2/2018 | Horwood | |
| 2018/0060394 A1* | 3/2018 | Gawande | G06F 9/50 |
| 2018/0101403 A1 | 4/2018 | Baldini Soares | |
| 2018/0196731 A1* | 7/2018 | Moorthi | G06F 8/71 |
| 2018/0300173 A1 | 10/2018 | Shimamura | |

OTHER PUBLICATIONS

Kim et al., "Serverless Data Analytics with Flint," University of Waterloo, Waterloo, Ontario, Canada, Oct. 2018, 5 pages.

* cited by examiner

*Primary Examiner* — Mark E Hershley
*Assistant Examiner* — Yohanes D Kelemework
(74) *Attorney, Agent, or Firm* — Van Leeuwen & Van Leeuwen; Edward J. Wixted

(57) ABSTRACT

An approach is provided in which the approach receives a query request to execute a query. The approach provides multiple query execution options based on multiple hardware configurations. The multiple query execution options include multiple execution times and multiple execution costs. The approach receives a selection that selects at least one of the query execution options and, in turn, executes the query on at least one of the hardware configurations based on the received selection.

9 Claims, 8 Drawing Sheets

User Preferences 500

| SELECT | PREFERENCE |
|---|---|
| 502 — ☐ | Always select fastest configuration |
| 504 — ☐ | Always select cheapest configuration |
| 506 — ☒ | [10%] 508 Premium willing to pay if configuration [20%] 510 faster |

512 — [SUBMIT]

User Interface 514

| | TIME | COST | PREPAY COST | PREPAY SELECTION |
|---|---|---|---|---|
| Base Configuration | 5:07 (516) | $0.25 (518) | ☐ (520) | ☐ (522) |
| Enhanced Configuration | 1:42 (524) | $0.45 (526) | $0.37 (528) | ☒ (530) |
| Super-Enhanced Configuration | 0:37 (532) | $1.09 (534) | $0.89 (536) | ☐ (538) |

540 — [SUBMIT]

*FIG. 5*

PROVIDING MULTI-TIER QUERY EXECUTION OPTIONS IN A SERVERLESS QUERY ENVIRONMENT

BACKGROUND

Cloud providers offer many different hardware tier configurations that optimize different hardware characteristics such as different performance Central Processing Units (CPUs), memories, networks, input/outputs (I/O), etc. Additionally, cloud providers may offer niche tiers that include hardware acceleration components such as Field Programmable Gate Arrays (FPGAs), Graphics Processing Units (GPUs), etc. Furthermore, even within a given hardware tier, vast differences exist between hardware that is allocated to virtual machines (VMs) and, as such, a user is responsible for deciding on which VM to place a given workload and when/if to move the workload to a different VM.

Hosting a software application usually involves managing some kind of server infrastructure (virtual or physical) as well as the operating system and other web server hosting processes required to execute an application. Using a virtual server from a cloud provider eliminates the physical hardware concerns, but still requires some level of management of the operating system and the web server software processes.

Serverless architectures have recently emerged that abstract the users from the underlying hardware. A serverless architecture is a software design pattern where applications are typically hosted by a third-party service and eliminate the need for server software and hardware management by a developer. With a serverless architecture, a user focuses purely on the individual functions in their application code. In a serverless environment, a user receives an endpoint through which to run the workload.

Functions as a Service (FaaS) is an implementation of a serverless architectures where users deploy individual functions or a piece of business logic. Principles of FaaS include complete management of servers, invocation based billing, and are event-driven and instantaneously scalable. Billing is typically performed using a price-per-unit metric (e.g., query, data accessed, etc.) in the absence of service level agreements (SLAs).

BRIEF SUMMARY

According to one embodiment of the present disclosure, an approach is provided in which the approach receives a query request to execute a query. The approach provides multiple query execution options based on multiple hardware configurations. The multiple query execution options include multiple execution times and multiple execution costs. The approach receives a selection that selects at least one of the query execution options and, in turn, executes the query on at least one of the hardware configurations based on the received selection.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting user interfaces that are provided to a client from an API;

DETAILED DESCRIPTION

Figure 1:
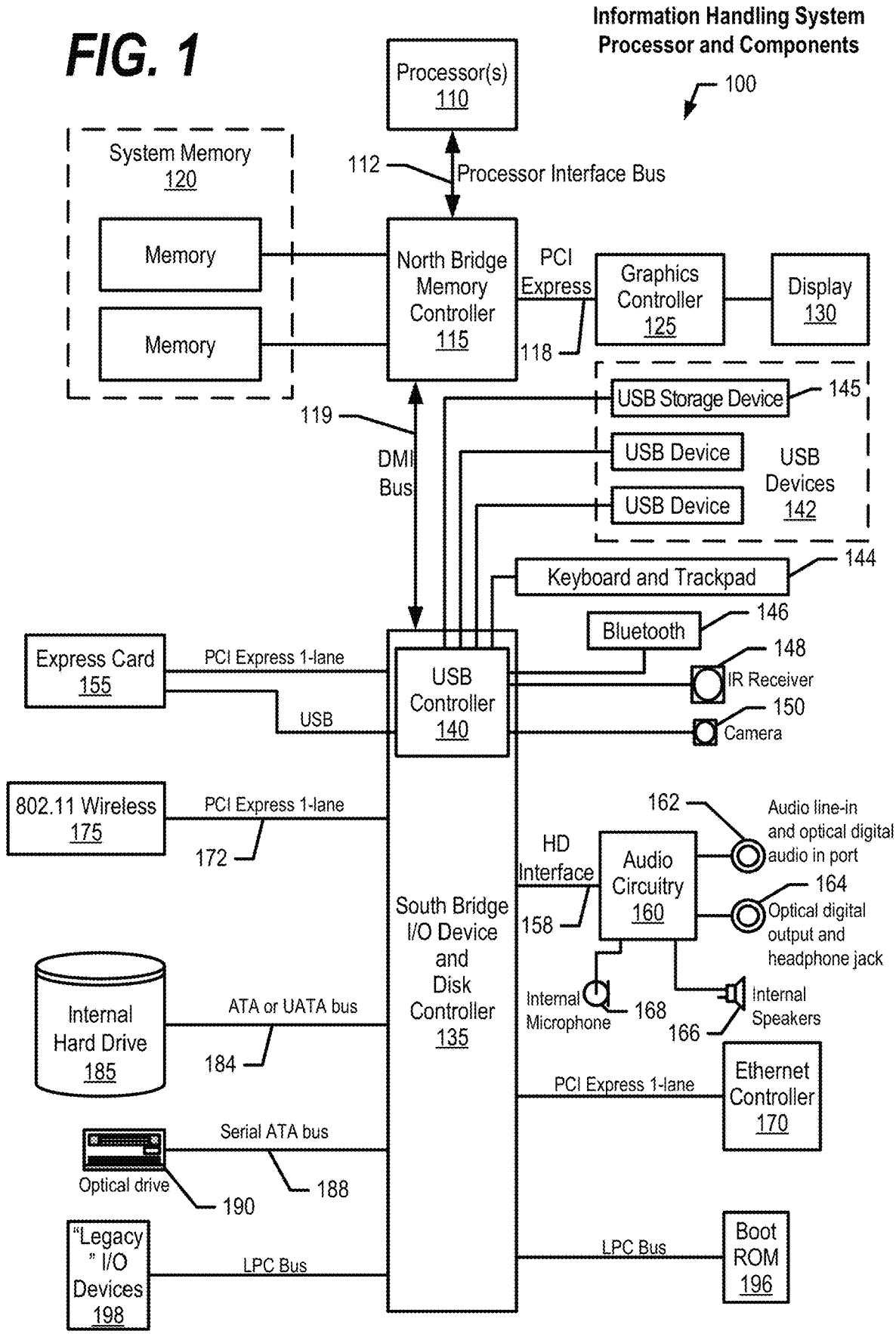
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112.

Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
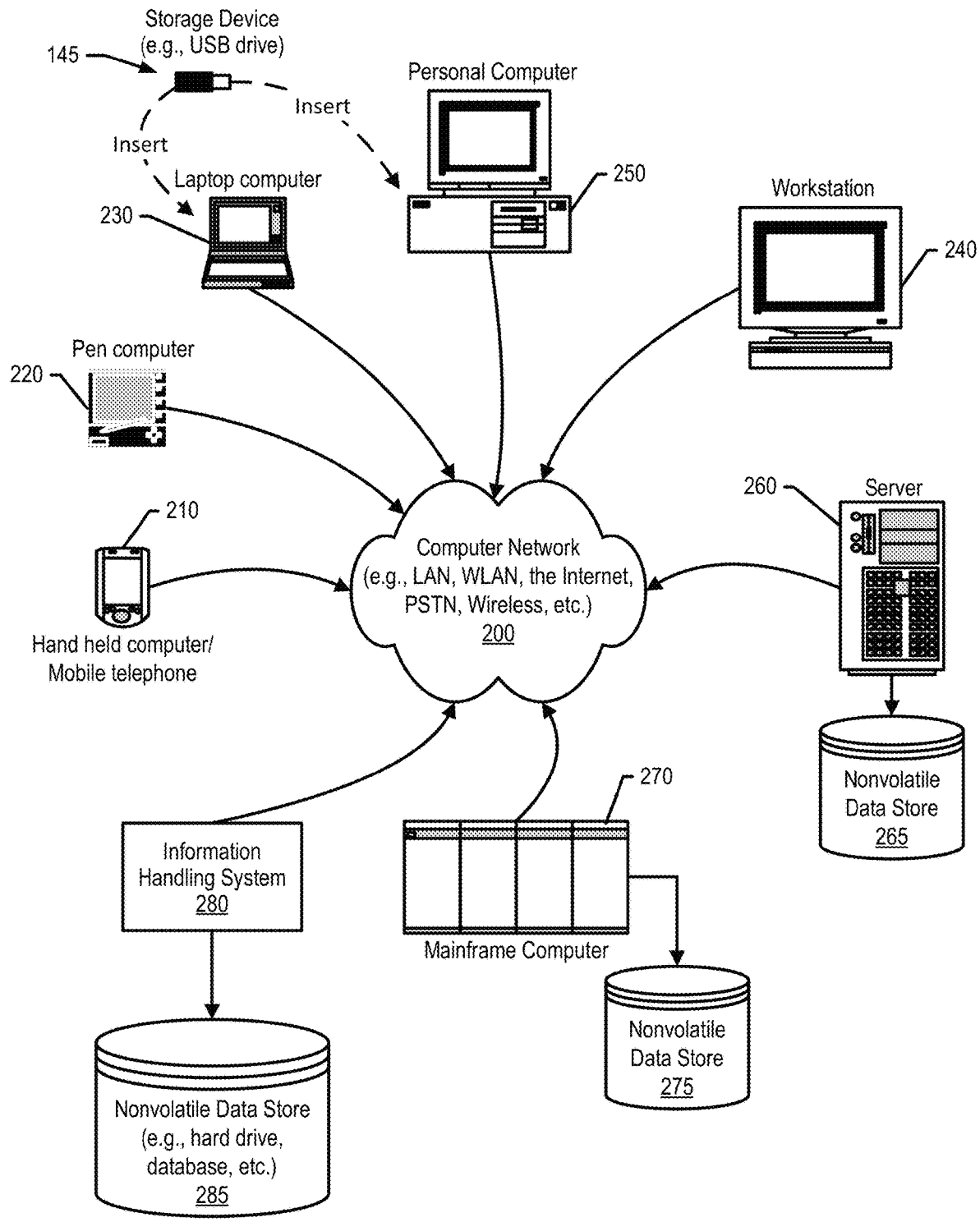
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, FAAS billing is typically performed using a price-per-unit metric (e.g., query, data accessed, etc.) in the absence of service level agreements (SLAs). A challenge found with non-SLA users is that they are not given price-per-unit billing options. As a result, a user may receive very slow query results that the user does not have time for which to wait. FIGS. 3 through 8 depict an approach that can be executed on an information handling system that provides a novel tiering strategy for serverless structured query language (SQL) queries that expose different levels of performance to the user. The user decides whether to obtain the query results faster at an increased cost or slower at a decreased cost. In one embodiment, the approach simultaneously executes the query on multiple sets of hardware tier configurations, also referred to herein as hardware configurations, such as a base hardware configuration and an enhanced hardware configuration. Then, when the query executing on the enhanced hardware configuration completes, the approach informs the user via a user interface or API the option to immediately obtain the query results for an added cost or wait for the base hardware configuration to complete the query at a reduced cost. In one embodiment, the approach provides an estimate of how much longer the query running on the base hardware configuration will take to complete and an estimate cost savings if the user chooses to wait.

In another embodiment, the approach provides cost and time estimates to a user before the queries execute to avoid having to physically execute the query on multiple sets of hardware (e.g., a pre-pay option). In this embodiment, the user initially decides whether to pre-pay the cost for immediate results. In another embodiment, the approach provides the option when the estimated time for the query to execute on the enhanced hardware configuration is dramatically different than the estimate time for the query to execute on the base hardware configuration (e.g., enhanced configuration may have FPGA/GPU for a 10× speed increase).

In another embodiment, the approach exposes a cost-per-time unit metric that allows the user to specify the amount of money that the user is willing to pay to save a given unit of time for query execution. With this metric, the query results can be automatically accepted by the approach (assuming the results fall within an acceptable cost/time) without user intervention.

In another embodiment, as time counts down to receive query results from a base hardware configuration, the approach may also reduce the cost of receiving the query results from the enhanced hardware configuration accordingly (i.e., scaling the price based on remaining wait time). In addition, the approach may implement a feedback loop that targets ever-better performing hardware to users who accept early query results.

Figure 3:
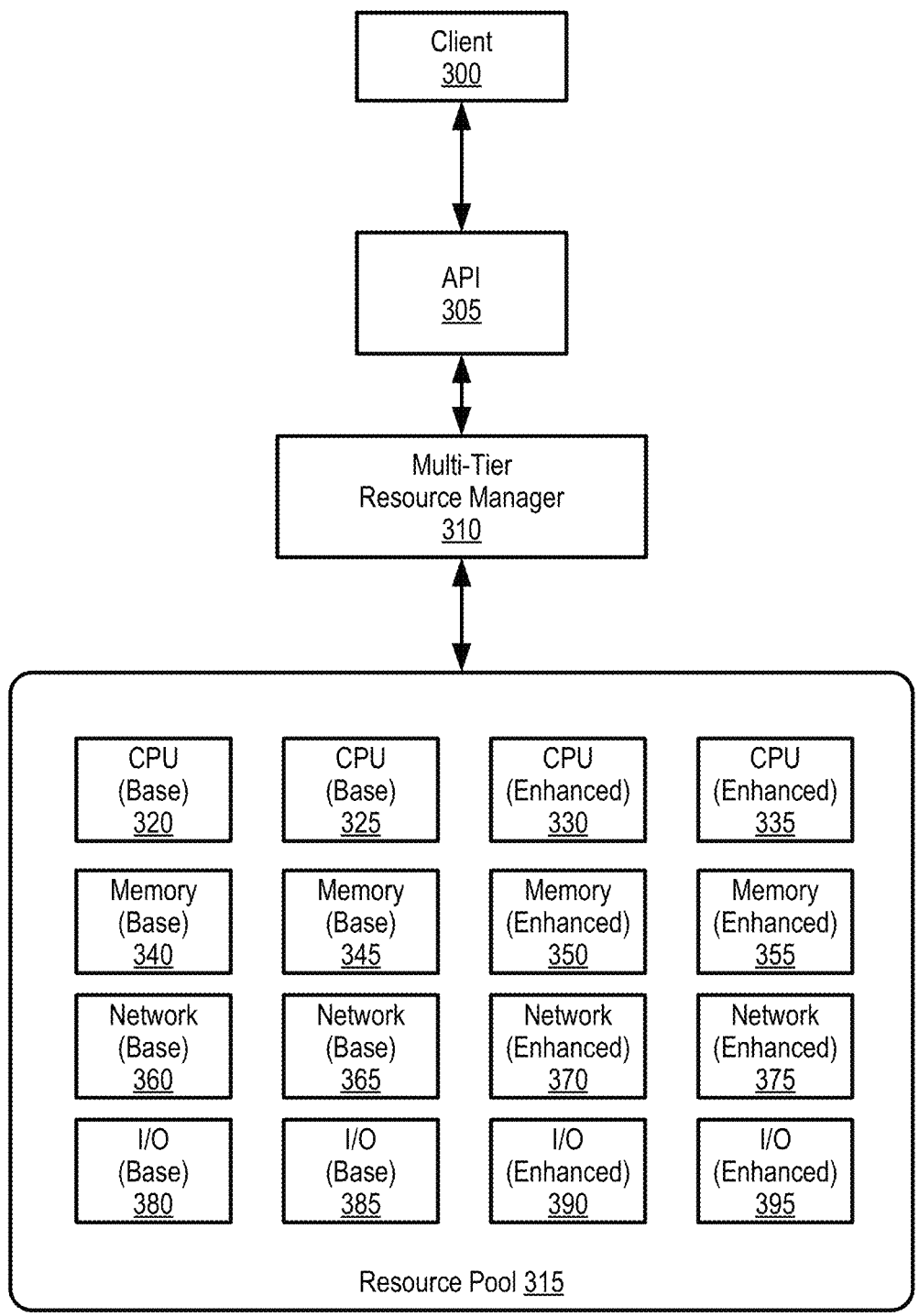
FIG. 3 is an exemplary diagram depicting a multi-tier resource manager grouping resources from a resource pool to provide multi-tier hardware configuration processing capabilities to a client.

FIG. 3 is an exemplary diagram depicting a multi-tier resource manager grouping resources from a resource pool to provide multi-tier hardware configuration processing capabilities to a client.

Client 300 interfaces with application program interface (API) 305 to send queries to multi-tier resource manager 310 and receive query results (either synchronously or asynchronously). When multi-tier resource manager 310 receives a query request, multi-tier resource manager 310 evaluates resource pool 315 and temporarily allocates various resources to various hardware configurations. Resource pool 315 includes multiple resource types with multiple performance tiers. For example, memories 340 and 345 may be hard disk drives and memories 350 and 355 may be solid state drives. As such, memories 350 and 355 have enhanced performance characteristics over memories 340 and 345 but are also more expensive than memories 340 and 345. Likewise, central processing units (CPUs) 320 and 325 are base processors compared to CPUs 330 and 335 that are enhanced (higher performance) processors. Networks 360 and 365 are base networks compared to networks 370 and 375 that are enhanced (higher performance) networks. Input/outputs (I/Os) 380 and 385 are base I/Os compared to I/Os 390 and 395 that are enhanced (higher performance) I/Os.

Multi-tier resource manager 310 computes estimate execution times and estimate execution costs based on the temporary hardware allocations and provides the times and costs to client 300 via API 305. In one embodiment, multi-tier resource manager 310 offers a reduced pre-pay option to the various hardware configurations if the user selects one of the hardware configurations prior to multi-tier resource manager 310 executing the query on each of the multiple hardware configurations (see FIG. 5 and corresponding text for further details).

Figure 7:
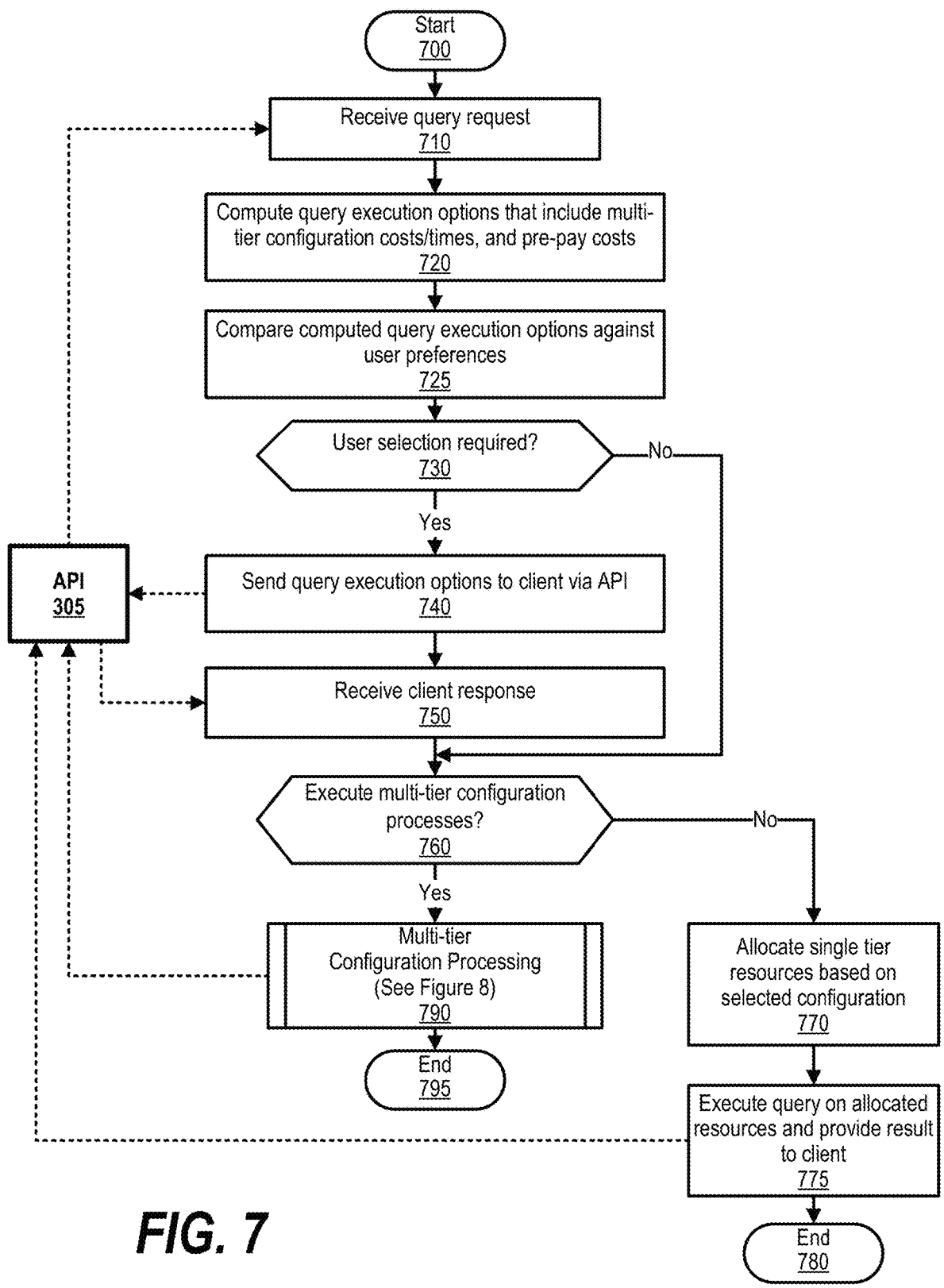
FIG. 7 is an exemplary flowchart showing steps taken to receive and process a query request.
Figure 8:
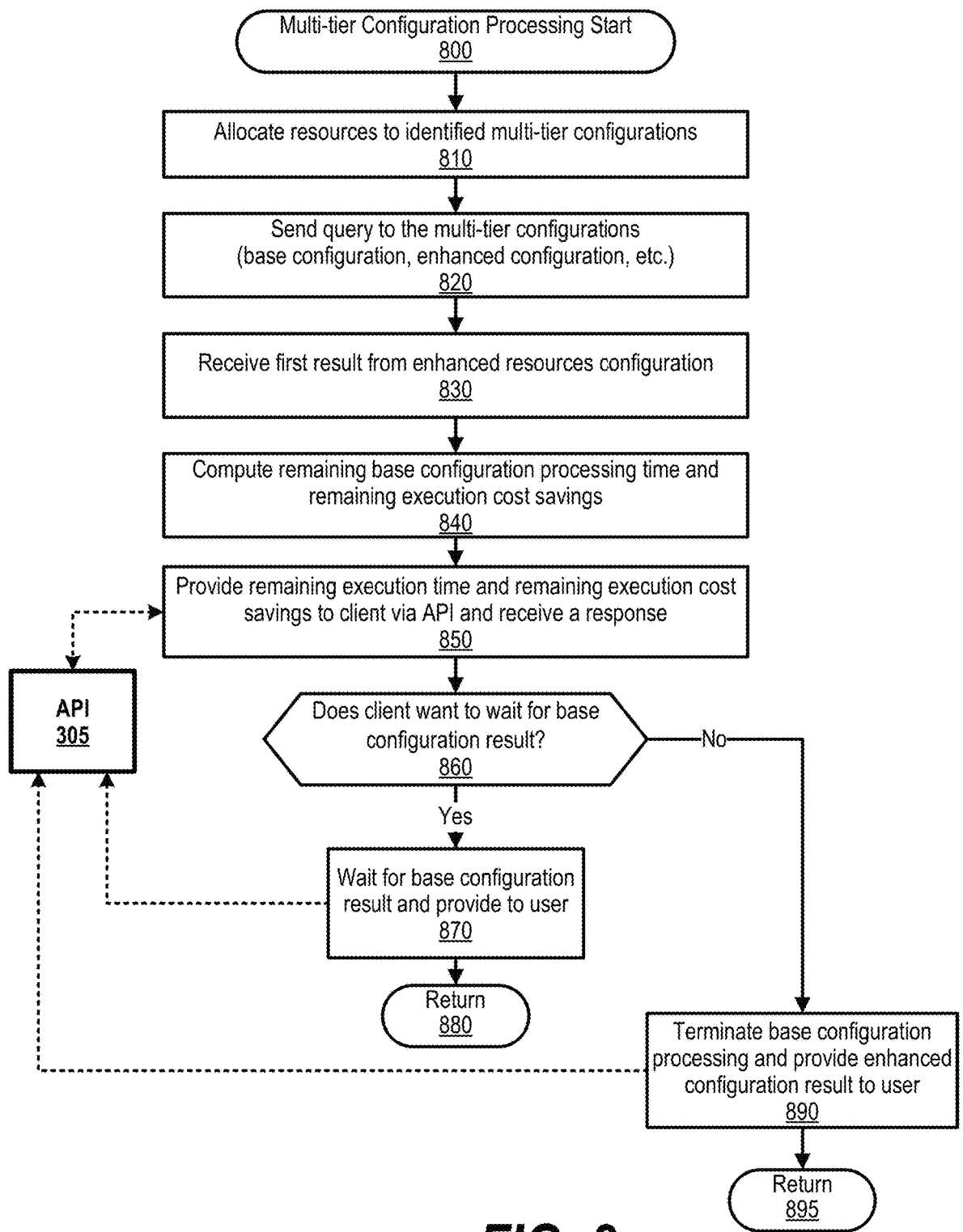
FIG. 8 is an exemplary flowchart showing steps taken to configure multiple hardware configuration tiers and execute queries on each of the multi-tier hardware configurations.

Multi-tier resource manager 310 receives a response from client 300 via API 305 and executes the query on one or both hardware configurations based on client 300's response (see FIGS. 7-8 and corresponding text for further details).

In one embodiment, when the enhanced hardware configuration completes,

API 305 receives a response from multi-tier resource manager 310 that includes real-time options available to client 300. In this embodiment, the response includes (i) an indication that the query results are available from the enhanced hardware configuration at an added cost, (ii) an estimate time remaining to receive query results from the base hardware configuration that is calculated using standard methods for query return time estimation (e.g., percentage of query plan executed/total estimated query cost), and (iii) a cost savings if the user chooses to wait for the base hardware configuration query results (see FIG. 6 and corresponding text for further details).

Figure 4:
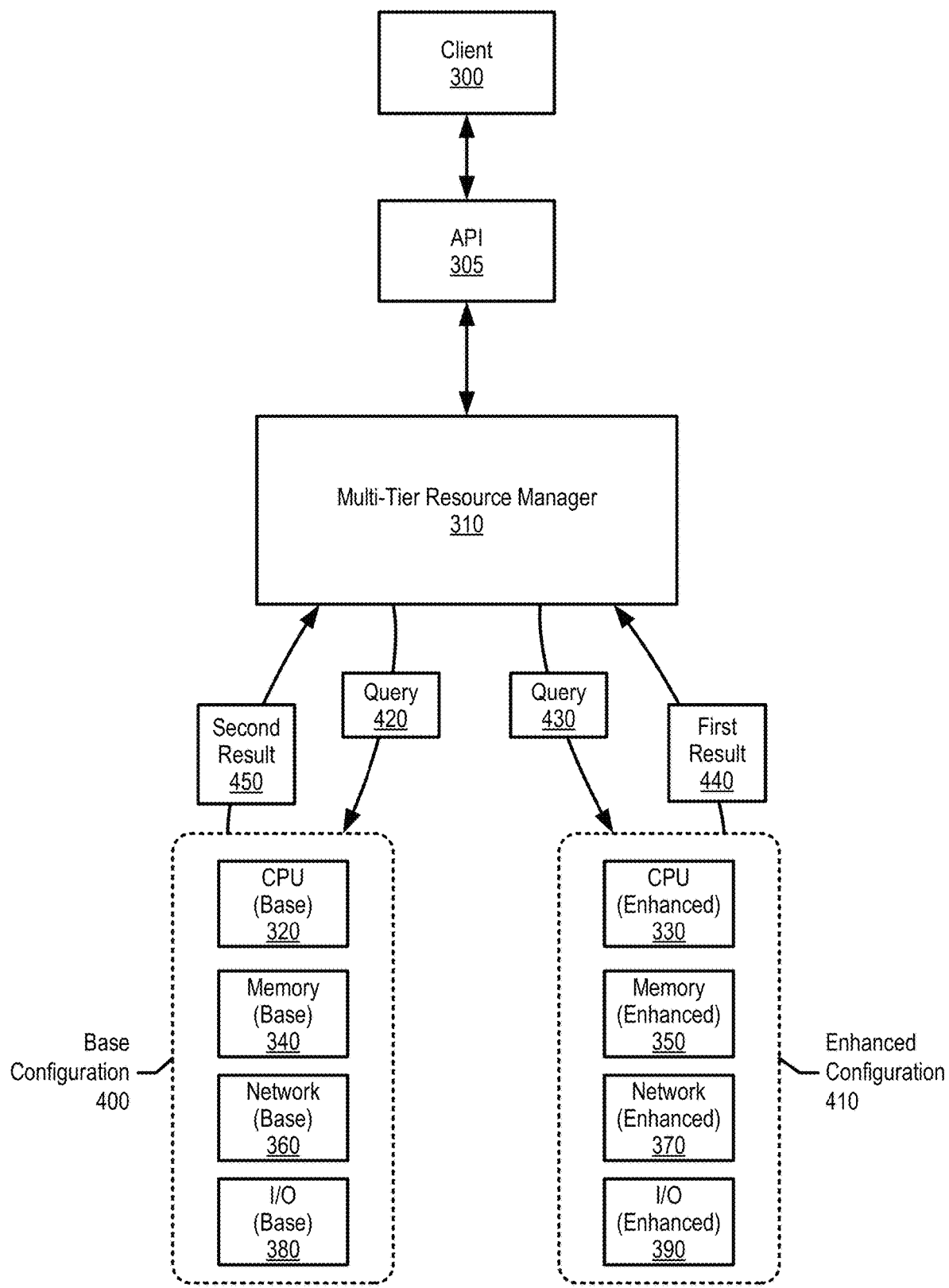
FIG. 4 is an exemplary diagram depicting a multi-tier resource manager executing similar queries on two different resource configurations.

FIG. 4 is an exemplary diagram depicting a multi-tier resource manager 310 executing similar queries on two different resource configurations. When a user does not select a pre-pay option, or when the user's preferences do not lean towards a specific hardware configuration (see FIG. 5 and corresponding text for further details), multi-tier resource manager 310 executes the same query 420, 430 on different hardware configuration tiers.

FIG. 4 shows that multi-tier resource manager 310 allocates CPU 320, memory 340, network 360, and I/O 380 to base hardware configuration 400, and allocates CPU 330, memory 350, network 370, and I/O to enhanced hardware configuration 410. Next, multi-tier resource manager 310 sends query 420 and 430 (the same query) to base hardware configuration 400 and enhanced hardware configuration 410 to execute. Multi-tier resource manager 310 receives first result 440 from enhanced hardware configuration 410 and, in one embodiment, informs client 300 that the first set of query results are complete and available query result options. Client 300 may choose to receive first result 440 at an added cost, or wait until base hardware configuration 400 provides second result 450 (see FIG. 6 and corresponding text for further details). In one embodiment, multi-tier resource manager 310 terminates query 420 on base configuration 400 when client 300 chooses to receive first result 440 from enhanced configuration 410. In another embodiment, multi-tier resource manager 310 terminates query 420 even if client 300 wishes to wait and just provides first result 440 to client 300 at a time when base configuration 400 is expected to complete.

FIG. 5 is an exemplary diagram depicting user interfaces provided to client 300 from API 305. User preferences 500 allow a user to specify global query preferences so that a user is not always asked for a user selection in response to submitting a query request. User preferences 500 show that when the user is not concerned with cost, the user may select box 502 and multi-tier resource manager 310 selects and executes a query having the highest performance hardware configuration. When the user is concerned with cost and is not concerned about time, the user may select box 504 and multi-tier resource manager 310 selects and executes a query on the cheapest hardware configuration.

In one embodiment, user preferences 500 allow the user to add conditions to selecting a lower cost or higher performance hardware configuration options. When the user is willing to pay a certain amount to receive query results if the results are available within a certain time, the user selects box 506, adds a price premium in box 508, and adds an execution time premium in box 510. In the example shown in FIG. 5, multi-tier resource manager 310 invokes the enhanced hardware configuration when its execution time is equal to or greater than 20% faster and equal to or less than a 10% execution cost premium. The user selects submit button 512 when complete. User preferences 500 allow a user to receive pre-pay cost savings when multi-tier resource manager 310 is able to execute the query on a single hardware configuration based on the user's preferences.

When multi-tier resource manager 310 receives a query request and is not able to determine a specific single hardware configuration on which to execute a query, multi-tier resource manager 310 computes estimate times/costs for various hardware configuration tiers and displays user interface 514. User interface 514 includes three hardware configuration options, which are a base hardware configuration, an enhanced hardware configuration, and a super-enhanced hardware configuration. Each configuration includes an estimate execution time (boxes 516, 524, and 532), a corresponding execution cost (boxes 518, 526, and 534), a corresponding pre-pay cost (boxes 520, 528, and 536), and pre-pay selection boxes (boxes 522, 530, and 538). The user selects button 540 to submit the user's selection. In one embodiment, if the user does not select a pre-pay option, multi-tier resource manager 310 executes the query on each of the hardware configurations and the user pays the corresponding cost. FIG. 5 shows that the user pre-selected the enhanced hardware configuration and will therefore pay $0.37 to receive the query results.

Figure 6:
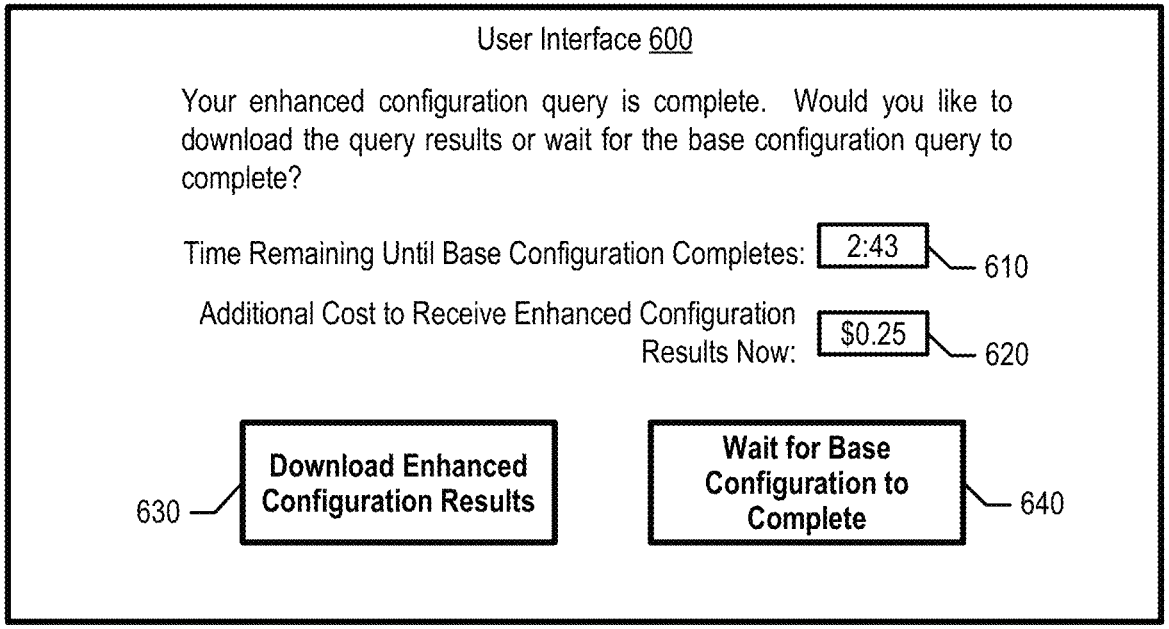
FIG. 6 is an exemplary diagram depicting a user interface that informs a user that results of an enhanced query have completed and options that are available to the user.

FIG. 6 is an exemplary diagram depicting a user interface that informs a user that results of an enhanced query have completed and options that are available to the user.

In one embodiment, when a user chooses to have multi-tier resource manager 310 execute the query on multiple hardware configurations, multi-tier resource manager 310 displays user interface 600 to the user when multi-tier resource manager 310 receives the first query result from the enhanced hardware configuration. User interface 600 informs the user that the first query results are complete and also informs the user of the time remaining until the less expensive base hardware configuration results are complete (box 610) as well as a cost savings if the user waits until the base configuration is complete (box 625).

If the user wishes to receive the first query results immediately, the user selects box 630 and pays the enhanced hardware configuration cost. However, if the user is willing to wait and receive the second query result at a reduced cost, the user selects box 640. Multi-tier resource manager 310 performs steps based on the user's selection (see FIGS. 7, 8, and corresponding text for further details).

FIG. 7 is an exemplary flowchart showing steps taken to receive and process a query request. FIG. 7 processing commences at 700 whereupon, at step 710, the process receives a query request from client 300 through API 305. At step 720, the process computes query execution options that include multi-tier configuration costs/times, and pre-pay costs.

At step 725, the process compares the computed query execution options against user preferences (see FIG. 5, user preferences 500 and corresponding text for further details). The process determines as to whether a user selection required based on the user preferences compared against the computed query execution options (decision 730). For example, if the user preferences indicate to always select a high performance option, the process selects the high performance hardware configuration and does not need to request an answer from the user.

If no user selection is required, then decision 730 branches to the 'no' branch bypassing steps 740 and 750. On the other hand, if user selection required, then decision 730 branches to the 'yes' branch whereupon, at step 740, the process sends the query execution options to client 300 via API 305 (see FIG. 5, user interface 514 and corresponding text for further details). At step 750, the process receives a client response indicating whether the user selects a pre-pay option or whether the user does not select a pre-pay option.

The process determines as to whether to execute multi-tier configuration processes (decision 760). For example, if a user selection is required and the user does not select a pre-pay option, then the process executes the query on multiple hardware configurations. If the process should execute multi-tier configuration processes, then decision 760 branches to the 'yes' branch whereupon, at predefined process 790, the process executes the query on multiple hardware configurations and provides results to client 300 via API 305 (see FIG. 8 and corresponding text for processing details). At step 795, the process ends.

On the other hand, if the process should not execute multi-tier configuration processes, such as when the user selects a pre-pay option, then decision 760 branches to the 'no' branch. At step 770, the process allocates a single tier hardware configuration based on selected configuration and, at step 775, the process executes the query on the allocated hardware configuration and provides results to client 300 through API 305. At step 780, the process ends.

FIG. 8 is an exemplary flowchart showing steps taken to configure multiple hardware configuration tiers and execute queries on each of the multi-tier hardware configurations. FIG. 8 processing commences at 800 whereupon, at step 810, the process allocates resources to various multi-tier configurations (from FIG. 7). At step 820, the process sends the query to each of the multi-tier configurations (base configuration, enhanced configuration, etc.).

At step 830, the process receives the first set of query results from one of the hardware configurations, such as the enhanced hardware configuration. At step 840, the process computes a remaining base configuration processing time and a remaining execution cost savings. At step 850, the process provides the remaining execution time and remaining execution cost savings to client via API 305 and receives a response (see FIG. 6 and corresponding text for further details).

The process determines as to whether the client wishes to wait for the base configuration result at a reduced cost (decision 860). If the client wishes to wait for the base configuration results, then decision 860 branches to the 'yes' branch whereupon, at step 870, the process waits for the base configuration results and provides the results to client 300 via API 305. In one embodiment, the process terminates the base configuration query and provides the enhanced configuration results to the user when the remaining execution time expires. FIG. 8 processing thereafter returns to the calling routine (see FIG. 7) at 880.

On the other hand, if the client does not wish to wait for the base configuration results, then decision 860 branches to the 'no' branch whereupon, at step 890, the process terminates the base configuration query processing and provides the enhanced configuration result to client 300 via API 305. FIG. 8 processing thereafter returns to the calling routine (see FIG. 7) at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
receiving a query request to execute a query;
determining a plurality of query execution options based on a plurality of hardware configurations, wherein the plurality of query execution options comprise a plurality of execution times and a plurality of execution costs, wherein a first hardware configuration corresponds to a first one of the plurality of execution options and a second hardware configuration corresponds to a second one of the plurality of execution options, and wherein a first execution time corresponding to executing the query on the first hardware configuration is less than a second execution time corresponding to executing the query on the second hardware configuration, and wherein a first execution cost corresponding to executing the query on the first hardware configuration is more than a second execution cost corresponding to executing the query on the second hardware configuration;
receiving a set of user preferences that comprise a cost premium that a user is willing to pay based on an execution time reduction to execute the query on the first hardware configuration instead of the second hardware configuration; and
executing the query on the first hardware configuration and inhibiting the execution of the query on the second hardware configuration in response to determining that a difference between the first execution time and the second execution time meets the execution time reduction, and a difference between the first execution cost and the second execution cost meets the cost premium.

2. The method of claim 1 further comprising:
providing a prepay execution cost option corresponding to the first hardware configuration to the API, wherein the prepay execution cost option is lower than the first execution cost; and
in response to receiving a selection of the prepay cost option, executing the query on the first hardware configuration and inhibiting the execution of the query on the second hardware configuration.

3. An information handling system comprising:
one or more processors;
a memory coupled to at least one of the processors;
a set of computer program instructions stored in the memory and executed by at least one of the processors in order to perform actions of:
receiving a query request to execute a query;
determining a plurality of query execution options based on a plurality of hardware configurations, wherein the plurality of query execution options comprise a plurality of execution times and a plurality of execution costs, wherein a first hardware configuration corresponds to a first one of the plurality of execution options and a second hardware configuration corresponds to a second one of the plurality of execution options, and wherein a first execution time corresponding to executing the query on the first hardware configuration is less than a second execution time corresponding to executing the query on the second hardware configuration, and wherein a first execution cost corresponding to executing the query on the first hardware configuration is more than a second execution cost corresponding to executing the query on the second hardware configuration;
receiving a set of user preferences that comprise a cost premium that a user is willing to pay based on an execution time reduction to execute the query on the first hardware configuration instead of the second hardware configuration; and
executing the query on the first hardware configuration and inhibiting the execution of the query on the second hardware configuration in response to determining that a difference between the first execution time and the second execution time meets the execution time reduction, and a difference between the first execution cost and the second execution cost meets the cost premium.

4. The information handling system of claim 3 wherein the processors perform additional actions comprising:
providing a prepay execution cost option corresponding to the first hardware configuration to the API, wherein the prepay execution cost option is lower than the first execution cost; and
in response to receiving a selection of the prepay cost option, executing the query on the first hardware configuration and inhibiting the execution of the query on the second hardware configuration.

5. A computer program product stored in a computer readable storage medium, comprising computer program code that, when executed by an information handling system, causes the information handling system to perform actions comprising:
receiving a query request to execute a query;
determining a plurality of query execution options based on a plurality of hardware configurations, wherein the plurality of query execution options comprise a plurality of execution times and a plurality of execution costs, wherein a first hardware configuration corresponds to a first one of the plurality of execution options and a second hardware configuration corresponds to a second one of the plurality of execution options, and wherein a first execution time corresponding to executing the query on the first hardware configuration is less than a second execution time corresponding to executing the query on the second hardware configuration, and wherein a first execution cost corresponding to executing the query on the first hardware configuration is more than a second execution cost corresponding to executing the query on the second hardware configuration;

receiving a set of user preferences that comprise a cost premium that a user is willing to pay based on an execution time reduction to execute the query on the first hardware configuration instead of the second hardware configuration; and executing the query on the first hardware configuration and inhibiting the execution of the query on the second hardware configuration in response to determining that a difference between the first execution time and the second execution time meets the execution time reduction, and a difference between the first execution cost and the second execution cost meets the cost premium.

6. The computer program product of claim 5 wherein the information handling system performs further actions comprising:

providing a prepay execution cost option corresponding to the first hardware configuration to the API, wherein the prepay execution cost option is lower than the first execution cost; and in response to receiving a selection of the prepay cost option, executing the query on the first hardware configuration and inhibiting the execution of the query on the second hardware configuration.

7. The method of claim 1 further comprising:

concurrently executing the query on both the first hardware configuration and the second hardware configuration;

in response to receiving a first set of query results from the first hardware configuration completing execution of the query, determining a remaining execution time and a remaining execution cost savings of completing the query on the second hardware configuration;

providing the remaining execution time and the remaining execution cost savings to an application programming interface (API); and in response to receiving a selection to wait for a second set of query results from the second hardware configuration:

terminating the query on the second hardware configuration before the second set of query results are received;

waiting for the remaining execution time to expire; and in response to the remaining execution time expiring, providing the first set of query results to the API when the remaining execution time expires.

8. The information handling system of claim 3 wherein the processors perform additional actions comprising:

concurrently executing the query on both the first hardware configuration and the second hardware configuration;

in response to receiving a first set of query results from the first hardware configuration completing execution of the query, determining a remaining execution time and a remaining execution cost savings of completing the query on the second hardware configuration;

providing the remaining execution time and the remaining execution cost savings to an application programming interface (API); and in response to receiving a selection to wait for a second set of query results from the second hardware configuration:

terminating the query on the second hardware configuration before the second set of query results are received;

waiting for the remaining execution time to expire; and in response to the remaining execution time expiring, providing the first set of query results to the API when the remaining execution time expires.

9. The computer program product of claim 5 wherein the information handling system performs further actions comprising:

concurrently executing the query on both the first hardware configuration and the second hardware configuration, wherein the first hardware configuration corresponds to a first one of the plurality of execution options and the second hardware configuration corresponds to a second one of the plurality of execution options;

in response to receiving a first set of query results from the first hardware configuration completing execution of the query, determining a remaining execution time and a remaining execution cost savings of completing the query on the second hardware configuration;

providing the remaining execution time and the remaining execution cost savings to an application programming interface (API); and in response to receiving a selection to wait for a second set of query results from the second hardware configuration:

terminating the query on the second hardware configuration before the second set of query results are received;

waiting for the remaining execution time to expire; and in response to the remaining execution time expiring, providing the first set of query results to the API when the remaining execution time expires.

\* \* \* \* \*